United States Patent
Pandit et al.

(10) Patent No.: US 12,498,253 B2
(45) Date of Patent: Dec. 16, 2025

(54) AMBIENT LIGHTING CONDITIONS FOR AUTONOMOUS VEHICLES

(71) Applicant: Waymo LLC, Mountain View, CA (US)

(72) Inventors: Salil Pandit, Mountain View, CA (US); Nirmal Patel, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 137 days.

(21) Appl. No.: 18/223,321

(22) Filed: Jul. 18, 2023

(65) Prior Publication Data

US 2024/0003710 A1    Jan. 4, 2024

Related U.S. Application Data

(63) Continuation of application No. 17/668,970, filed on Feb. 10, 2022, now Pat. No. 11,747,167, which is a
(Continued)

(51) Int. Cl.
*G01C 21/00* (2006.01)
*G01C 21/34* (2006.01)
(Continued)

(52) U.S. Cl.
CPC ..... *G01C 21/3874* (2020.08); *G01C 21/3453* (2013.01); *G01C 21/3837* (2020.08);
(Continued)

(58) Field of Classification Search
CPC .......... G01C 21/3874; G01C 21/3453; G01C 21/3837; G01C 21/3848; G01C 21/3811;
(Continued)

(56) References Cited

U.S. PATENT DOCUMENTS 9,651,390 B1   5/2017   Thompson et al.
9,963,106 B1   5/2018   Ricci
(Continued)

FOREIGN PATENT DOCUMENTS

CN   105931488 A   9/2016
CN   107097780 A   8/2017
(Continued)

OTHER PUBLICATIONS

Office Action for Japanese Patent Application No. 2023-037208, Nov. 22, 2023, 9 Pages.
(Continued)

*Primary Examiner* — Tuan C To
*Assistant Examiner* — Dominick Mulder
(74) *Attorney, Agent, or Firm* — Botos Churchill IP Law

(57) ABSTRACT

The disclosure relates to using ambient lighting conditions with passenger and goods pickups and drop offs with autonomous vehicles. For instance, a map of ambient lighting conditions for stopping locations may be generated by receiving ambient lighting condition data for predetermined stopping locations and arranging this data into a plurality of buckets based on time and one of the stopping locations. A vehicle may then be controlled in an autonomous driving mode in order to stop for a passenger by both observing ambient lighting conditions for different stopping locations and, in some instances, also using the map.

20 Claims, 10 Drawing Sheets

Related U.S. Application Data continuation of application No. 16/125,025, filed on Sep. 7, 2018, now Pat. No. 11,280,625.

(51) Int. Cl.
*G05D 1/00* (2006.01)
*G06F 16/29* (2019.01)

(52) U.S. Cl.
CPC ....... *G01C 21/3848* (2020.08); *G05D 1/0088* (2013.01); *G05D 1/0231* (2013.01); *G06F 16/29* (2019.01)

(58) Field of Classification Search
CPC ............. G01C 21/3841; G05D 1/0088; G05D 1/0231; G05D 1/0212; G06F 16/29; B60W 2420/403; B60W 2555/20; B60W 2556/10; B60W 2556/45; B60W 60/00253; B60W 30/181; B60W 30/14; B60W 40/02; B60W 50/14; B60W 2050/146; B60W 2520/04; B60K 35/00; B60Q 1/04
USPC .......................................................... 701/23
See application file for complete search history.

(56) References Cited

U.S. PATENT DOCUMENTS

| | | | |
|---|---|---|---|
| 10,434,935 B1 | 10/2019 | Zhang et al. | |
| 11,003,187 B2* | 5/2021 | Banzhaf | G08G 1/095 |
| 11,643,099 B2 | 5/2023 | Cullinane et al. | |
| 11,747,167 B2* | 9/2023 | Pandit | G01C 21/3453 |
| | | | 701/23 |
| 2006/0074532 A1 | 4/2006 | Hong | |
| 2006/0239016 A1* | 10/2006 | Woo | B60Q 3/16 |
| | | | 362/459 |
| 2010/0271195 A1* | 10/2010 | Biondo | B60Q 1/1423 |
| | | | 340/463 |
| 2013/0030670 A1* | 1/2013 | Tomik | B60R 16/03 |
| | | | 701/102 |
| 2013/0128074 A1* | 5/2013 | Mitsugi | H04N 21/4363 |
| | | | 348/333.01 |
| 2014/0218521 A1* | 8/2014 | Tanaka | H04N 7/18 |
| | | | 348/148 |
| 2014/0232854 A1* | 8/2014 | Kim | G06V 10/763 |
| | | | 348/135 |
| 2014/0379197 A1* | 12/2014 | Eckert | B60T 7/22 |
| | | | 701/28 |
| 2015/0016678 A1* | 1/2015 | Imaeda | G06V 20/584 |
| | | | 382/103 |
| 2015/0172582 A1 | 6/2015 | Kiyohara et al. | |
| 2015/0346727 A1 | 12/2015 | Ramanujam | |
| 2016/0379070 A1* | 12/2016 | Kasaoki | G06V 20/584 |
| | | | 348/148 |
| 2017/0023945 A1 | 1/2017 | Cavalcanti et al. | |
| 2017/0090480 A1 | 3/2017 | Ho et al. | |
| 2017/0267233 A1 | 9/2017 | Minster. et al. | |
| 2017/0278402 A1 | 9/2017 | Yalla et al. | |
| 2018/0101154 A1 | 4/2018 | Nomoto et al. | |
| 2018/0105039 A1* | 4/2018 | Yeomans | G05D 1/0061 |
| 2018/0130347 A1 | 5/2018 | Ricci et al. | |
| 2018/0135997 A1 | 5/2018 | Thompson et al. | |
| 2018/0136656 A1 | 5/2018 | Rasmusson et al. | |
| 2018/0137375 A1 | 5/2018 | Takemura et al. | |
| 2018/0139368 A1* | 5/2018 | Nakayama | G06V 20/584 |
| 2018/0202822 A1 | 7/2018 | Delizio | |
| 2018/0215275 A1 | 8/2018 | Patel | |
| 2018/0301031 A1 | 10/2018 | Naamani et al. | |
| 2018/0314902 A1 | 11/2018 | Suzuki et al. | |
| 2019/0001933 A1* | 1/2019 | Dellock | B60K 35/60 |
| 2019/0187714 A1* | 6/2019 | He | A01D 34/78 |
| 2019/0193633 A1* | 6/2019 | Ichikawa | B60R 21/00 |
| 2019/0384060 A1* | 12/2019 | Naruse | H04N 23/76 |

FOREIGN PATENT DOCUMENTS

| | | | |
|---|---|---|---|
| CN | 110400091 A | 11/2019 | |
| EP | 3211372 A1 | 8/2017 | |
| JP | 2001206103 A | 7/2001 | |
| JP | 2008049764 A | 3/2008 | |
| JP | 2014146125 A | 8/2014 | |
| JP | 2015175694 A | 10/2015 | |
| JP | 2017027220 A | 2/2017 | |
| JP | 2017174417 A | 9/2017 | |
| KR | 100809342 B1 | 3/2008 | |
| KR | 101862994 B1 | 5/2018 | |
| WO | 2014007153 A1 | 1/2014 | |
| WO | 2017040260 A1 | 3/2017 | |
| WO | 2017079222 A1 | 5/2017 | |
| WO | 2018119907 A1 | 7/2018 | |
| WO | 2018125973 A1 | 7/2018 | |
| WO | 2019065697 A1 | 4/2019 | |

OTHER PUBLICATIONS

The First Office Action for Chinese Patent Application No. 201980067507.X, Jan. 18, 2024, 21 Pages.
Fukushima, Dimmer for use in vehicle, JP2001206103A (Year: 2001).
Notice of Allowance for Korean Patent Application No. 10-2021-7009849, Nov. 25, 2022.
Notice of Preliminary Rejection for Korean Patent Application No. 10-2021-7009849, May 2, 2022.
Notice of Reasons for Rejection for Japanese Patent Application No. 2021-510448, Jun. 29, 2022.
The Partial Supplementary European Search Report for European Patent Application No. 19857505.2, Apr. 21, 2022.
"International Search Report and Written Opinion for Application No. PCT/US2019/049486 dated Dec. 20, 2019", 9 pages.
The Extended European Search Report for European Patent Application No. 25179418.6, Sep. 5, 2025, 10 Pages.

\* cited by examiner

AMBIENT LIGHTING CONDITIONS FOR AUTONOMOUS VEHICLES

CROSS REFERENCE TO RELATED APPLICATIONS

The present application is a continuation of U.S. patent application Ser. No. 17/668,970, filed Feb. 10, 2022, which is a continuation of U.S. patent application Ser. No. 16/125,025, filed Sep. 7, 2018, now issued as U.S. Pat. No. 11,280,625, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location.

When a person (or user) wants to be physically transported and/or to transport goods between two locations via a vehicle, they may use any number of taxi or delivery services. To date, these services typically involve a human driver who is given dispatch instructions to a location to pick up and drop off the user and/or goods. Generally these locations are worked out via physical signals (i.e. flagging down the driver), a phone call where the user explains where he or she actually is, or an in person discussion between the driver and user. In the case of an autonomous vehicle, such coordination is often difficult or impossible to achieve and may lead to significant inconvenience to the user in terms of the distance to reach a vehicle or desired destination where the vehicle stops to pick up or drop off a passenger and/or goods.

BRIEF SUMMARY

One aspect of the disclosure provides a method of generating a map of ambient lighting conditions. The method includes retrieving, by one or more processors, data generated by one or more vehicles identifying ambient lighting conditions at different locations at different points in time; identifying, by the one or more processors, one of a predetermined set of stopping locations for a vehicle based on the different locations; arranging, by the one or more processors, at least some of the data into a plurality of buckets based on the different points in time and the identified one of the predetermined set of stopping locations, each bucket being associated with a particular period of time; and generating, by the one or more processors, the map using the plurality of buckets.

In one example, generating the map includes incorporating the plurality of buckets into a prior map. In another example, providing the plurality of buckets to a computing device of an autonomous vehicle in order to allow the autonomous vehicle to identify a pickup stopping location of the set of predetermined stopping locations based on historical ambient lighting conditions. In another example, the method also includes providing the plurality of buckets to a computing device of an autonomous vehicle in order to allow the autonomous vehicle to identify a drop off stopping location of the set of predetermined stopping locations based on historical ambient lighting conditions. In another example, the method also includes receiving, from a client computing device, a request to identify one or more possible pickup locations for a trip, and in response to the request to the client computing device, providing information identifying one of a predetermined set of stopping locations using at least one of the plurality of buckets. In this example, the method also includes selecting the at least one of the plurality of buckets based on an expected time that a passenger will be picked up for the trip. In addition, the method also includes providing, in response to the request to the client computing device, a notification identifying an ambient lighting condition of the at least one of the plurality of buckets at the expected time that the passenger will be picked up for the trip. In another example, the method also includes receiving, from a client computing device, a request to identify one or more possible drop off locations for a trip, and in response to the request to the client computing device, providing information identifying one of a predetermined set of stopping locations using at least one of the plurality of buckets. In this example, the method also includes selecting the at least one of the plurality of buckets based on an expected time that a passenger will be dropped off from the trip. In addition, the method also includes providing, in response to the request to the client computing device, a notification identifying an ambient lighting condition of the at least one of the plurality of buckets at the expected time that the passenger will be dropped off for the trip.

Another aspect of the disclosure provides a method of controlling a vehicle in order to stop the vehicle. The method includes receiving, by one or more processors, a stopping location for the vehicle; controlling, by the one or more processors, the vehicle in an autonomous driving mode towards the stopping location; while controlling the vehicle in the autonomous driving mode, observing, by the one or more processors, the stopping location; identifying, by the one or more processors, a new stopping location based on the observation and ambient lighting conditions of the new stopping location; and controlling, by the one or more processors, the vehicle in the autonomous driving mode to stop at the new stopping location.

In one example, observing the stopping location includes determining ambient lighting conditions for the stopping location. In this example, determining the ambient lighting conditions for the stopping location is based on an image captured by a camera of the vehicle. In addition or alternatively, determining the ambient lighting conditions for the stopping location is based on an exposure value for a camera of the vehicle. In addition or alternatively, determining the ambient lighting conditions for the stopping location is based on light sensors of the vehicle. In addition or alternatively, determining the ambient lighting conditions for the stopping location is based on a current state of headlights of the vehicle. In addition or alternatively, determining the ambient lighting conditions for the stopping location is based on a current state of an internal display of the vehicle. In addition or alternatively, determining the ambient lighting conditions of the new stopping locations is based on an image captured by a camera of the vehicle. In addition or alternatively, determining the ambient lighting conditions of the new stopping location is based on map information identifying historical ambient lighting conditions of the new stopping location. In another example, observing the stopping location includes determining that the stopping location is currently unavailable.

DETAILED DESCRIPTION

Overview

Figure 1:
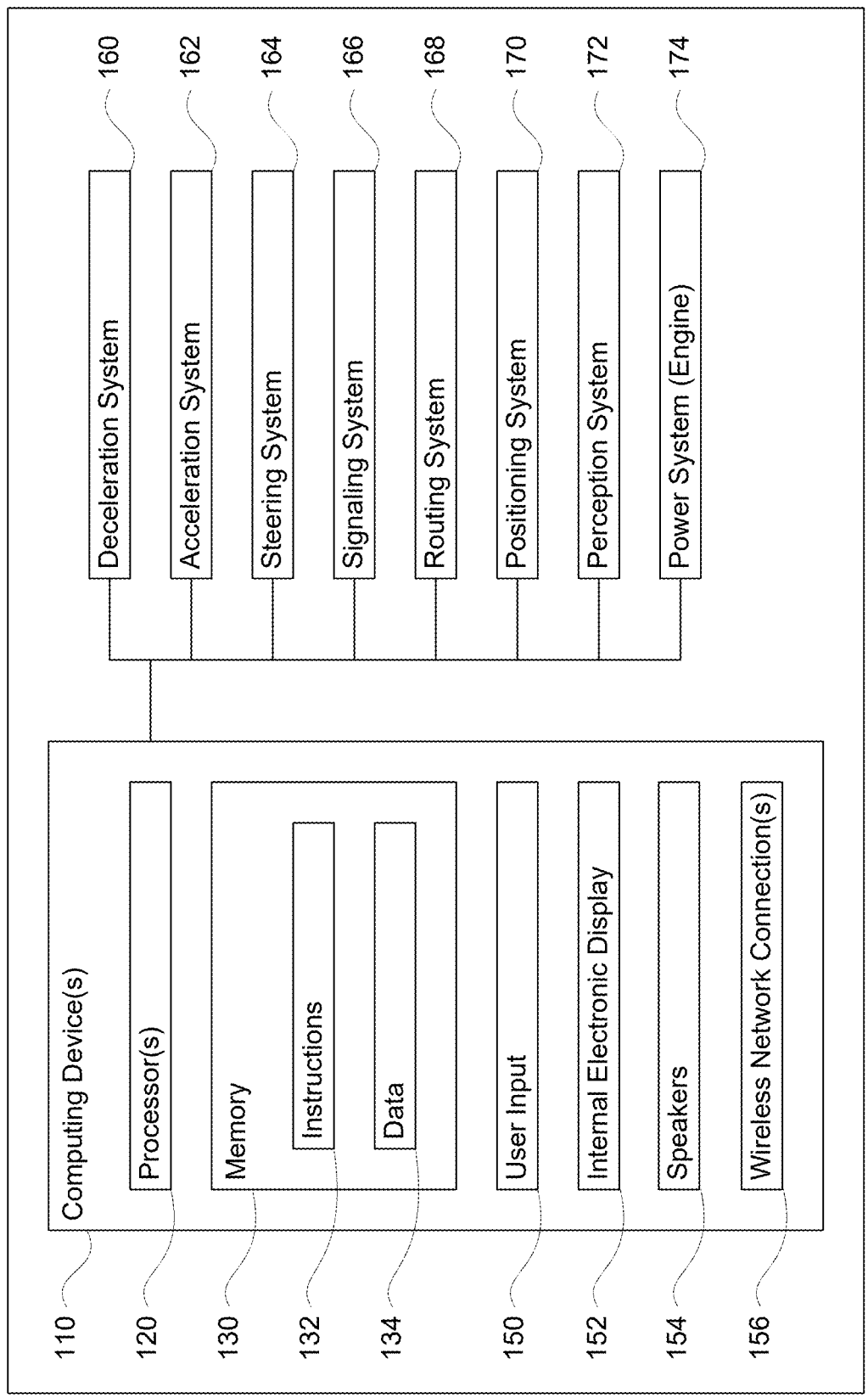
FIG. 1 is a functional diagram of an example vehicle in accordance with an exemplary embodiment.

This technology relates to facilitating safe and comfortable passenger pickups and drop offs for autonomous vehicles. For instance, such vehicles may be available for trip services 24 hours a day, seven days a week. During nighttime hours, it is preferable for passenger comfort and safety if the vehicle is stopped for pickups and drop offs in well-lit areas. As an example, during a pickup, a well-lit area may make it easier and less stressful for a passenger to wait for a vehicle. Similarly, at drop off, the passenger is better able to see if anything, such as a puddle or raise curb, or anyone is around the vehicle. In still other examples, when picking up or dropping off goods, a person may be more comfortable or better able to see hazards around the vehicle in a well-lit area. Thus, picking a parking location according to the ambient lighting conditions may be an important safety feature of an autonomous taxi and/or delivery service. The ambient lighting conditions for a given parking location may be determined in any number of different ways. For instance, the vehicle's computing devices may receive feedback from light sensors of the vehicle. This information may be especially useful for determining ambient lighting conditions for the vehicle's current location. In addition or alternatively, the ambient lighting conditions for a given parking area may be determined from data generated by the vehicle's perception system. In addition or alternatively, the ambient lighting conditions for a given parking area may be determined from historical data. For instance, ambient lighting conditions may be collected by this or other vehicles driving in various areas at different points in time, aggregated, and used to generate map information. This map information may be sent to vehicles of a fleet of vehicles.

The ambient lighting conditions may be used in any number of different ways to facilitate better passenger pickups and drop offs. For instance, when a user (or future passenger) is scheduling a trip, the ambient lighting conditions in the map information may be used to determine the best pickup locations and/or drop off location for the passenger. In addition or alternatively, when a vehicle is in the act of attempting to pull over or searching for a parking location, the vehicle's computing devices may be able to make some minor adjustments to the parking locations based on real time observations.

The features described herein may allow for better passenger experience in terms of comfort and safety by stopping an autonomous vehicle for pickups and drop offs in well-lit areas. By using historical data, passengers are able to arrange pickups and drop offs in advance in well-lit areas. In addition, by using real time information collected at an autonomous vehicle, the vehicle is able to react to changing circumstances. Finally, as discussed further below, the ambient lighting conditions may also be used to identify parking locations for a vehicle when not service passengers in order to increase safety and security for the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. For instance, the memory may store steering, acceleration and deceleration profiles and limits for the vehicle which can be used to determine how to control the various systems of the vehicle. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2A:
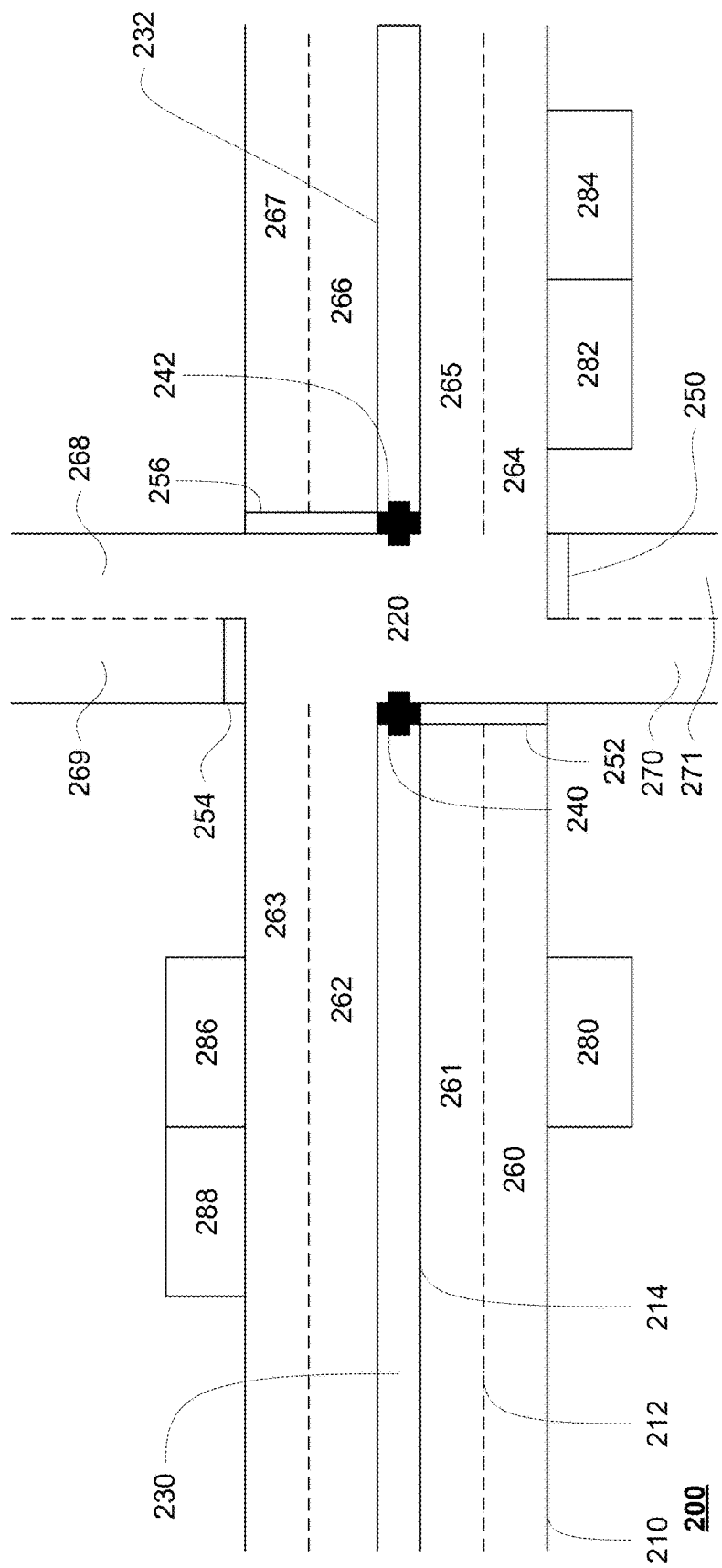
FIGS. 2A and 2B are examples of map information in accordance with aspects of the disclosure.
Figure 2B:
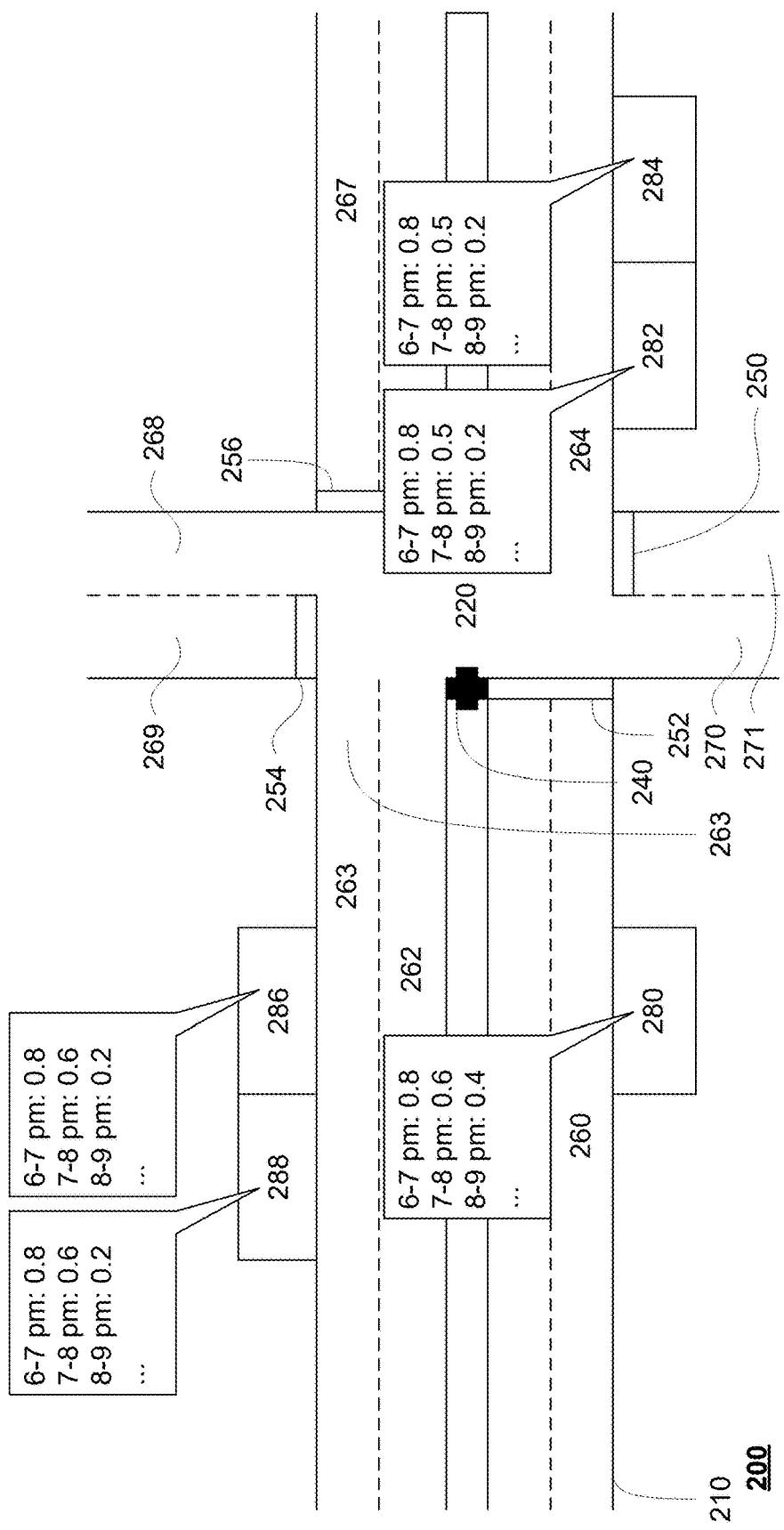

FIGS. 2A and 2B is an example of map information 200 for a section of roadway including intersection 220. FIGS. 2A and 2B depict a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information may also store predetermined stopping locations including pickup locations and drop off locations. Pickup locations may refer to locations where the autonomous vehicle stops to wait to pick up a passenger for a trip. Drop off locations may refer to locations where the autonomous vehicle stops to allow for a passenger to exit the vehicle after a trip. Other stopping locations, such as those where the vehicle stops, allows the passenger to exit and waits for the passenger to return are also possible. Stopping locations may also be used by the vehicle to stop and wait for a user to pick up or drop off goods. For instance, if the vehicle is delivering food to a user, the vehicle may stop and wait in a stopping location. Each of these may simply be parking locations that are discrete, pre-determined pickup and drop off locations, and in some instances, hand-selected by a human operator or learned by a computing device over time. In this regard, each stopping location may be a locations where a vehicle could stop selected through some manual or automated analysis of the characteristics of each location. As shown in FIGS. 2A and 2B, the map information includes a plurality of stopping locations 280-288. In this example, each stopping location corresponds to a parking spot adjacent to a lane, but these predetermined stopping locations can be all types of parking locations.

At least some of these stopping locations may include data for ambient lighting conditions. As discussed further below, a given stopping location may be associated with data identifying expected ambient lighting conditions at different times, for instance stopping locations 280, 282, 284, 286, 288 are each associated with data including values identifying ambient lighting conditions for "bucketized" periods between 6 and 7 pm local time, 7 and 8 pm local time, 8 and 9 am local time, etc. In this example, the values 0.2, 0.6, 0.8, etc. may represent ambient lighting conditions normalized to a linear scale from 0 to 1, where 0 is no ambient lighting conditions and 1 is very bright ambient lighting conditions. The actual "buckets" of time used may be determined based on the amount of data for that given stopping location.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
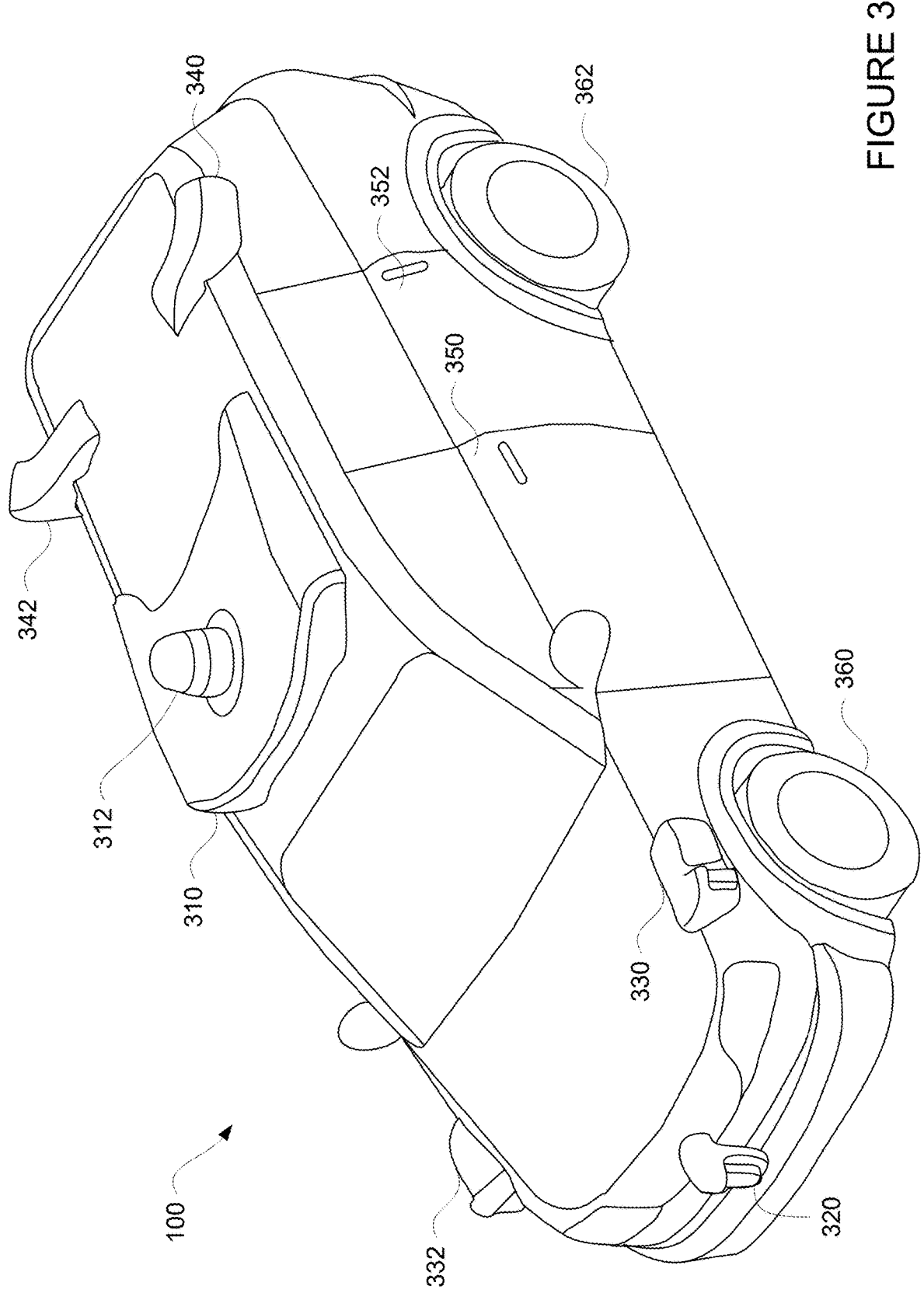
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
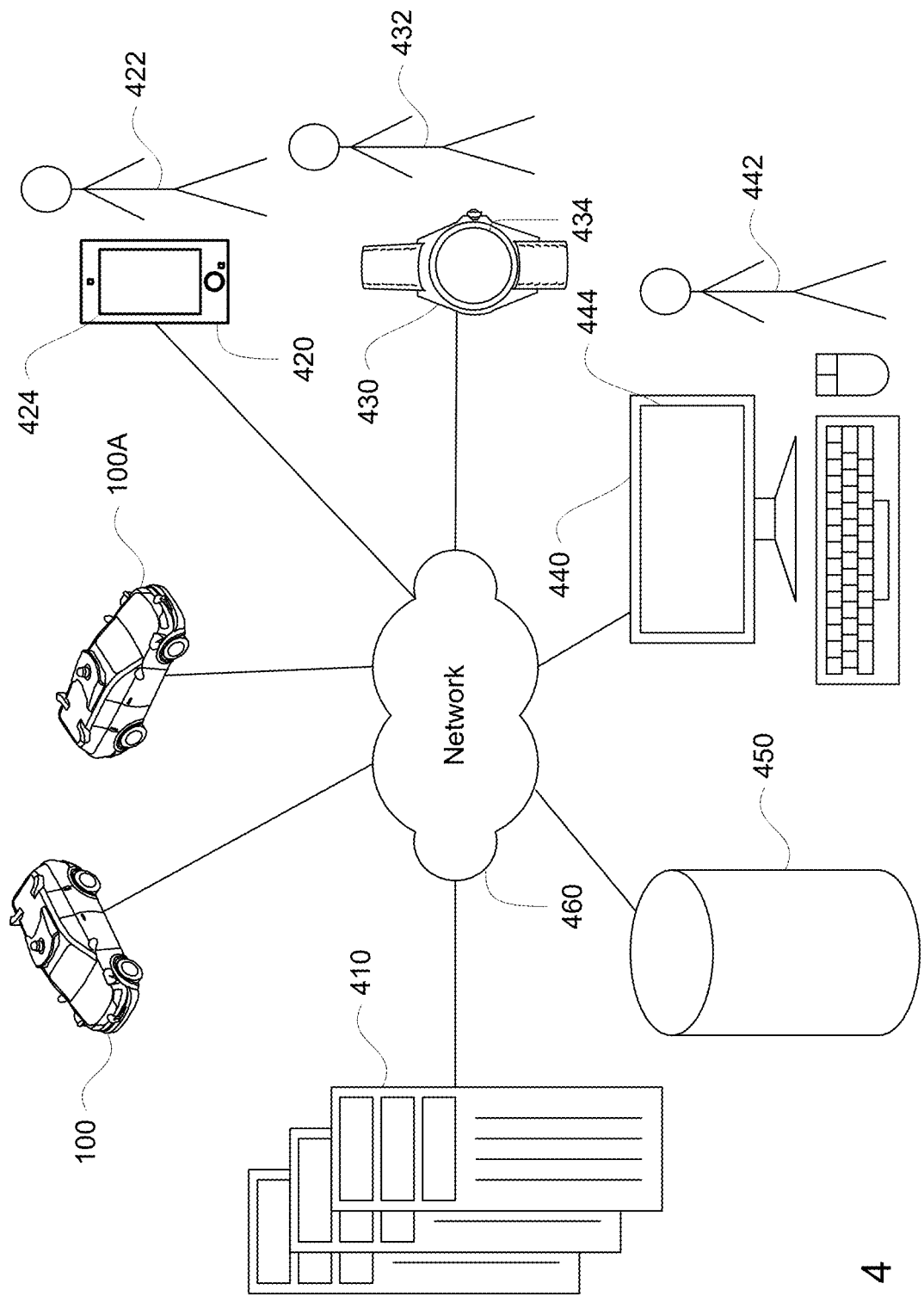
FIG. 4 is a pictorial diagram of an example system in accordance with aspects of the disclosure.
Figure 5:
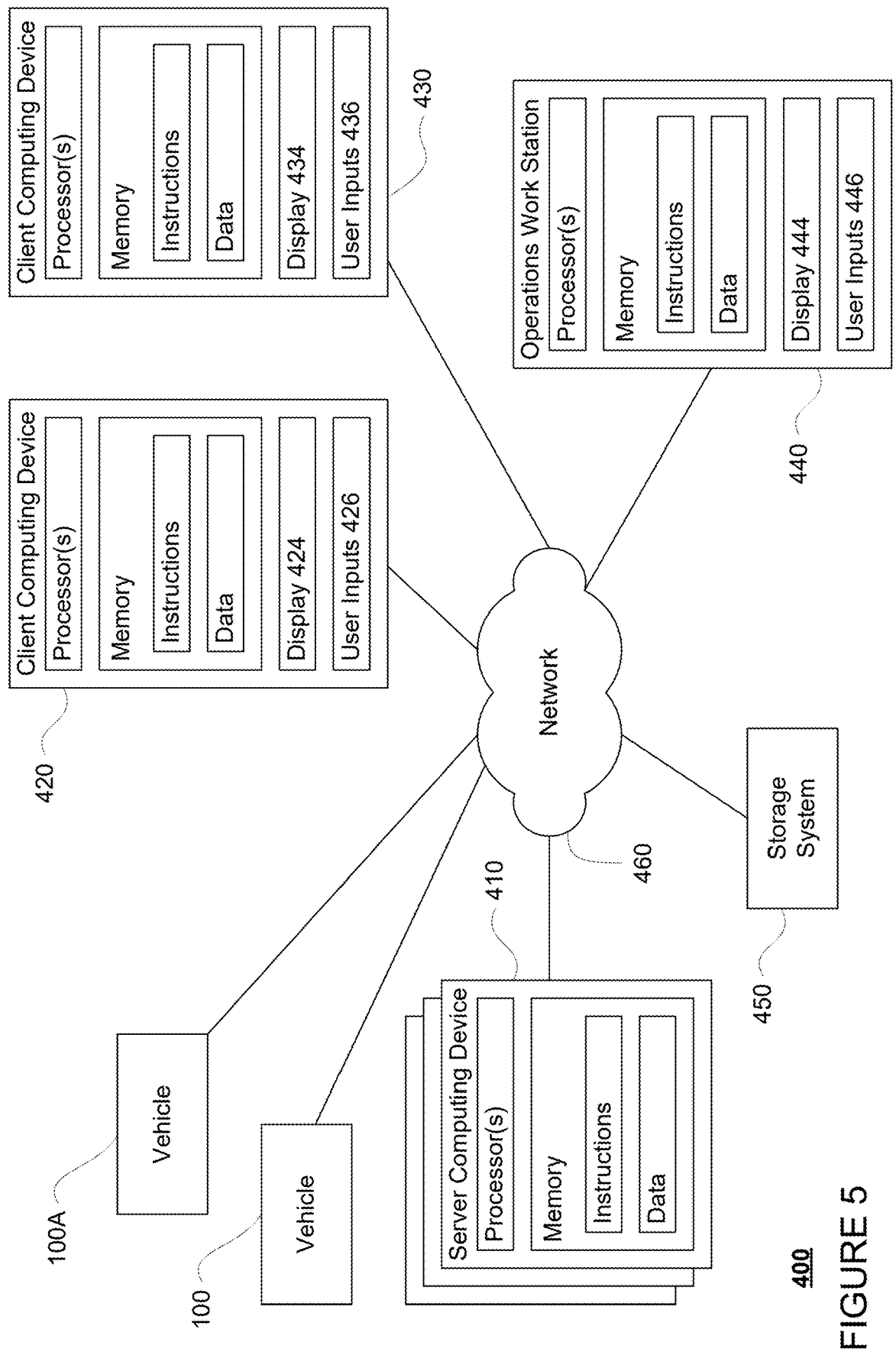
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information. This information may include ambient lighting conditions reported for different areas and/or stopping locations by vehicles of the fleet at various dates and times. In addition, the storage system may also store one or more copies of the map information 200. This information may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
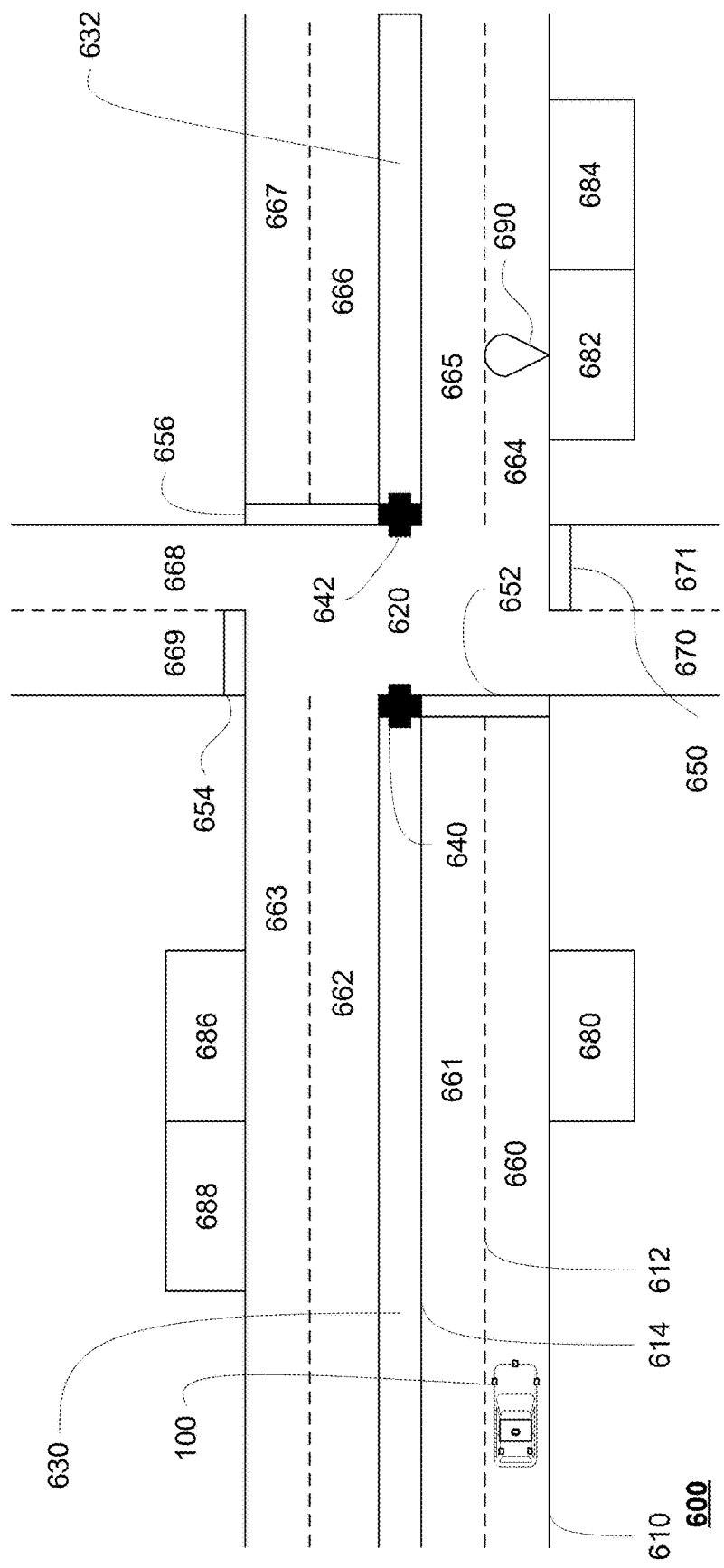
FIG. 6 is an example representation of a driving situation in accordance with aspects of the disclosure.

As noted above, the computing devices 110 may use the routing system to determine a route to a destination, for instance to pick up a passenger, pick up goods, drop off a passenger, and/or deliver goods. The computing devices 110 may then periodically generate trajectories for the vehicle to follow for some time and distance into the future in order to follow the route to the destination. For instance, FIG. 6 represents an example section of roadway 600 corresponding to map information 200. In this regard, lane lines 610, 612, 614, correspond to lane lines 210, 212, 214, intersection 620 corresponds to intersection 220, median areas 630, 632 correspond to median areas 230, 232, traffic signals 640, 642 correspond to traffic signals 240, 242, stop lines 650, 652, 654, 656 correspond to stop lines 250, 252, 254, 256, lanes 660-671 correspond to lanes 260-271, and parking spots 680-688 corresponding to stopping locations 280-288.

As shown, vehicle 100 is depicted as approaching intersection 620 in lane 660 and attempting to reach a destination represented by marker 690. At this point, the computing devices 110 may begin to identify a stopping location proximate to the destination, for instance, in order to pick up, drop off, or simply park the vehicle 100. As indicated above, in order to do so, the computing devices 110 may attempt to determine ambient lighting conditions for stopping locations proximate to the destination.

Figure 7:
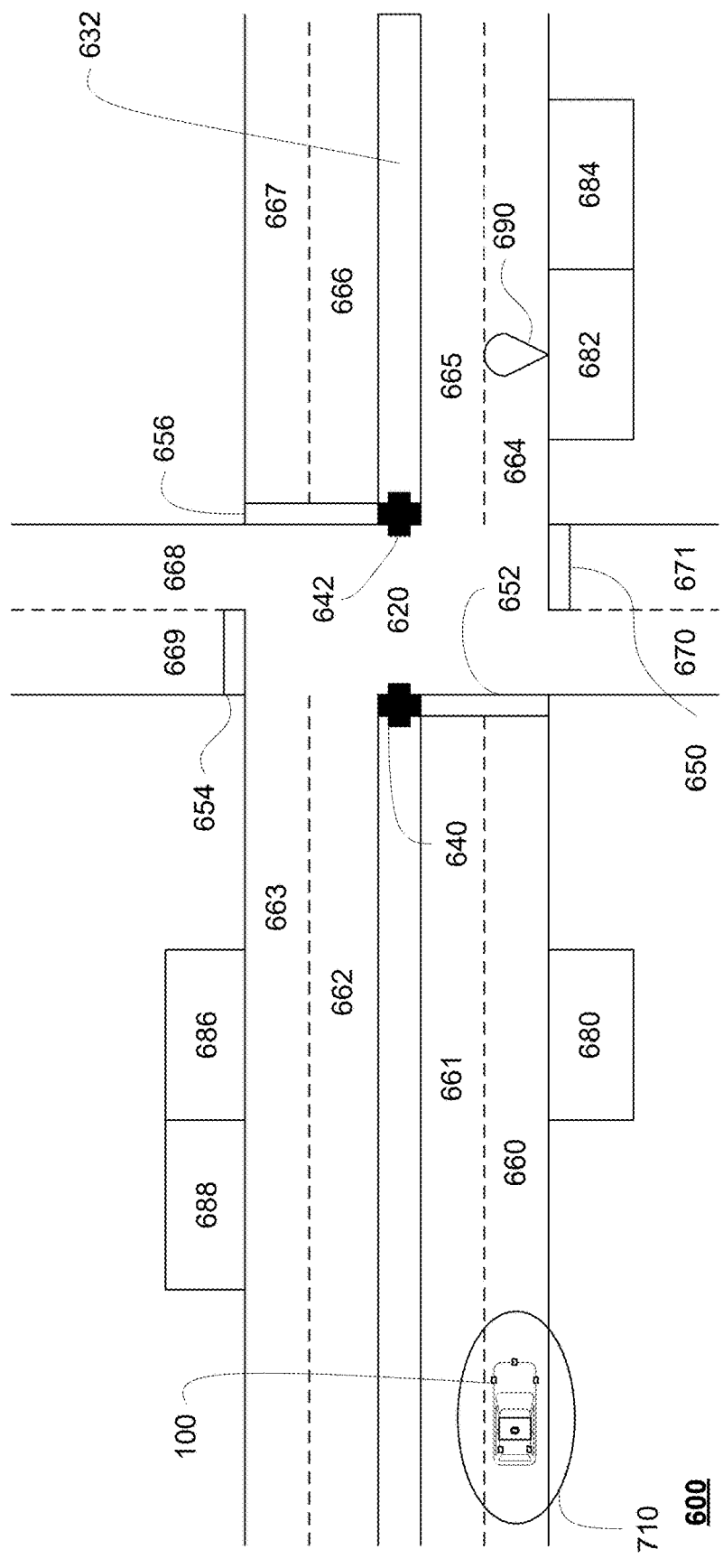
FIG. 7 is an example representation of a driving situation and data in accordance with aspects of the disclosure.

The ambient lighting conditions for a given stopping location may be determined in any number of different ways. At least some of these may include real time determinations. For instance, the computing devices 110 may receive feedback from the vehicle's light sensors, such as those used to control the state of a vehicle's headlights and adjust brightness of internal electronic displays, such as internal electronic display 152. If feedback from the light sensors is not directly available to the computing devices 110, this information may also be gleaned from the state of the vehicle's headlights and/or internal electronic displays. In other words, the computing devices 110 may be able to determine from this information whether it was "dark enough" for the vehicle to have its headlights on or the internal electronic displays at certain brightness. This information may be converted to some normalized value, for instance, such as a value on a linear scale from 0 to 1 as discussed above, where 0 is no ambient lighting conditions (for instance, when the vehicle's headlights are on and internal electronic display 152 is at its brightest) and 1 is very bright ambient lighting conditions (for example, when the vehicle's headlights are off and the internal electronic display 152 is very dark). This information may also be especially useful for determining ambient lighting conditions for the vehicle's current location, for instance, within an area 710 nearby vehicle 100 as shown in example 700 of FIG. 7.

In addition or alternatively, the ambient lighting conditions for a given stopping location may be determined from data generated by the vehicle's perception system. As indicated above, the perception system 172 may include a plurality of different sensors, some of which, such as still or video cameras, may be used to determine ambient lighting conditions. For instance, "live" camera images of the vehicle's environment may be analyzed to determine ambient lighting conditions. This may include processing pixels to determine whether the area toward which the camera is oriented towards is a bright area. If the pixels are bright, and the image has a short exposure time, this may indicate that the area is also bright. Similarly, pixels of camera images for the same location at different times of day may be analyzed as described above to determine ambient lighting conditions, which may be converted to some normalized value, for instance a value on the aforementioned scale of 0 to 1, etc., and stored in the map information 200 as discussed above. As an example, some parking locations will be much darker or "gone" in night time images, and some parking locations will still be fairly clear.

As another instance, the ambient lighting conditions may be determined in real time by using camera exposure values. As an example, when capturing images, the cameras of the perception system 172 may automatically recalibrate exposure values given the ambient lighting conditions. In this regard, the exposure values may be considered a proxy for how bright the area viewable by the vehicle's camera currently is. For instance, real time exposure values may be used to determine the ambient lighting conditions. The longer the exposure value, the darker the scene or rather, the lower the ambient lighting conditions (i.e. the closer to 0 on the aforementioned scale of 0 to 1. Similarly, the shorter the exposure value, the brighter the scene or rather, the higher the ambient lighting conditions (i.e. the closer to 1 on the aforementioned scale of 0 to 1. In addition, exposure values for time periods when the sun is not out (i.e. dusk till dawn on any given day of the year) may be reviewed to identify those with small exposure times which would indicate brighter artificial lighting. Again, this information may be converted to some normalized value, for instance, a value on the aforementioned scale of 0 to 1, etc., and stored in the map information as discussed above.

For the most part, because of the location and field of view of the cameras of the vehicle's perception system 172, these images may be of parking locations some distance away from the vehicle. To get more detailed information about the ambient lighting conditions at the vehicle, images that include at least some part of the vehicle (i.e. some visible vehicle panel) may be used for the analysis. Of course, when analyzing the image, the vehicle panel portion may be used as a point of reference to compare the lighting conditions to increase accuracy of the ambient lighting determination.

In addition or alternatively, the ambient lighting conditions for a given parking area may be determined from historical data. For instance, the server computing devices 410 may periodically receive data identifying ambient lighting conditions detected by various vehicles of the fleet, such as vehicles 100 and 100A, at different locations at different points in time. For instance, the data may include feedback from the light sensors or camera images collected by a vehicle's perception system as discussed above for a given point in time. In addition or alternatively, the data may include some usable normalized value representative of ambient lighting conditions for a given point in time, such as a linear scale from 0 to 1, etc. by the computing devices of the vehicles reporting the data. As indicated above, this information may be stored in the storage system 450. The server computing devices 410 may retrieve this data in order to generate map data including ambient lighting conditions.

In order to generate the ambient lighting condition data for a given stopping area, one of the stopping location of the map information may be identified. Any data associated with that identified stopping location may be retrieved from the storage system 450 by the server computing devices 410. This retrieved data may then be converted to the usable normalized value representative of ambient lighting conditions as indicated above. These values may then be "bucketized" or arranged into a plurality of buckets, clusters or other groupings of discrete time intervals based on the different points in time associated with the data. Each bucket may be associated with a particular a particular period of time or discrete time interval, such as every 30 and/or 60 minutes from 4 pm to 9 am. Some filtering to remove outliers or down weighing of values from data captured at times near the edge of a bucket may also be used. Depending on the amount of data, these buckets may even be further divided into different times of year, such as different seasons, months, or even specific days of the year. This may be especially useful in certain locations as daylight hours change throughout the year.

The plurality of buckets and values may then be used to generate a map of ambient lighting conditions. This may include averaging or otherwise reducing the remaining values (i.e. post filtering if the aforementioned filtering is performed) in each bucket to a single usable value and associating this information with the geographic location of the identified stopping location. In addition, generating the map may include incorporating the reduced values from the plurality of buckets into a prior map, such as the map information 200 and the examples of ambient lighting conditions as shown in FIG. 2B. The server computing devices 410 may then store this information in the storage system 450.

The server computing devices 410 may then periodically send updates to the vehicles of the fleet including any updates to the plurality of buckets and/or the reduced values for any stopping locations of the map information. As discussed further below, this may allow a computing device of an autonomous vehicle in to identify a stopping parking location, for instance for a pick up or a drop off, of the predetermined stopping locations based on historical ambient lighting conditions.

The ambient lighting conditions may be used in any number of different ways to facilitate better passenger pickups and drop offs. For instance, the server computing devices 410 may receive from a client computing device, such as client computing device 420 a request to identifying or more possible pickup or drop off locations for a trip. In response, the server computing devices 410 may use the map information and ambient lighting conditions of the storage system 450 to identify one of the predetermined parking locations. For instance, given an estimated expected time of arrival at the pickup or drop off location, the server computing devices may identify a stopping location associated with one of the plurality of buckets having the greatest reduced value for ambient lighting conditions for that expected time of arrival. If the time of an expected pickup or drop off is between buckets, the ambient lighting conditions for two buckets may be averaged to increase flexibility and usefulness of the information.

The server computing devices 410 may then send this identified stopping location to the client computing device 420. In addition, the server computing devices 410 may also provide a notification identifying the expected ambient lighting condition for the identified stopping location. This may provide the user attempting to arrange the pickup up or drop off with a better understanding of why the server computing devices 410 are suggesting a particular stopping location.

In addition or alternatively, ambient lighting conditions for various nearby stopping locations may also be provided in order to facilitate a in making the best choice when setting up pickup or drop off of one or more passengers or goods. The user may even be provided with notifications indicating which locations are the most well-lit or why a suggested stopping location is different from a user preference or prior pickup or drop off location. However, in some instances, some parking locations where the ambient lighting conditions is expected to be "too low" (i.e. closer to 0 on the aforementioned scale of 0 to 1), may simply be ignored (not suggested) or simply made unavailable for selection by the user. In this regard, the process that selected suggested pickup and/or drop off locations may be biased to suggest more well-lit parking locations over less well-lit parking locations depending upon the time of day that the pickup or drop off is expected to occur.

Figure 8:
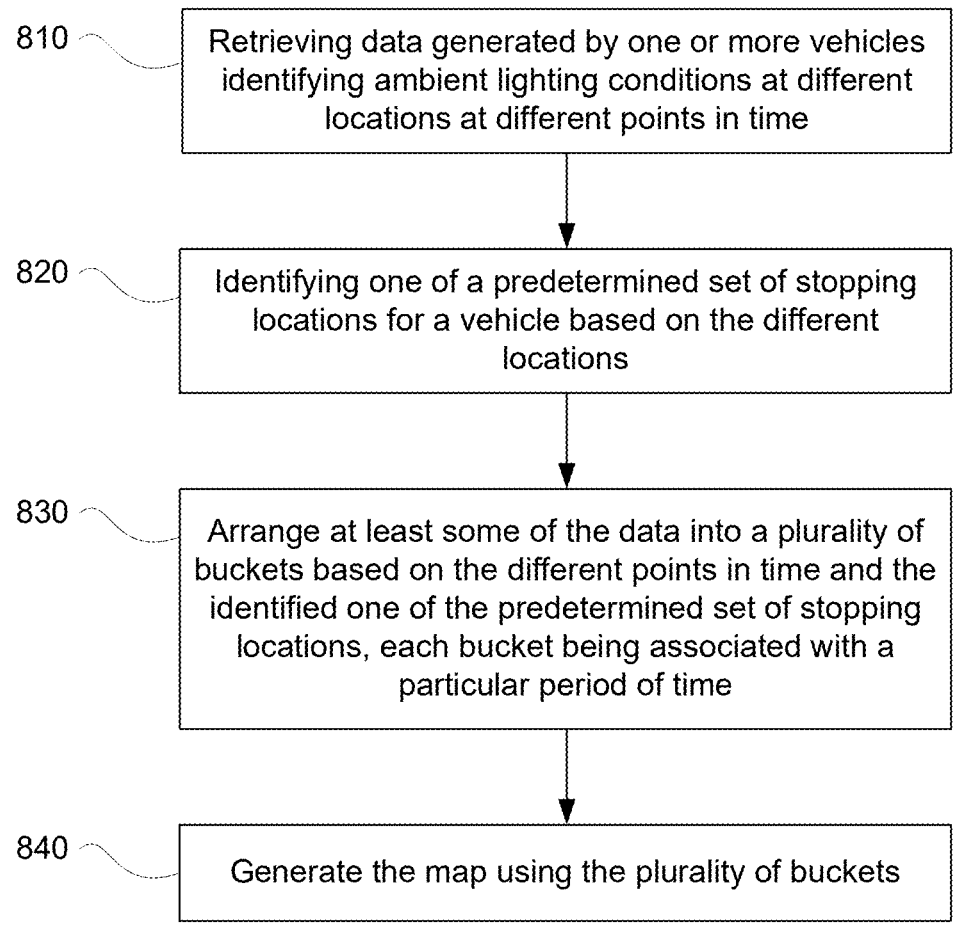
FIG. 8 is an example flow diagram in accordance with aspects of the disclosure.

FIG. 8 includes an example flow diagram 800 of some of the examples for generating a map of ambient lighting conditions, which may be performed by one or more processors such as processors of computing devices 110. In this example, at block 810, data generated by one or more vehicles identifying ambient lighting conditions at different locations at different points in time may be retrieved. At block 820, one of a predetermined set of stopping locations for a vehicle based on the different locations is identified. At block 830, at least some of the data is arranged into a plurality of buckets based on the different points in time and the identified one of the predetermined set of stopping locations. Each of these buckets is associated with a particular period of time. At block 840, the map is generated using the plurality of buckets.

In addition or alternatively, as noted above with reference to FIG. 6, when a vehicle is in the act of attempting to pull over or searching for a parking location, the computing devices 110 may be able to make some minor adjustments to the parking locations based on real time observations. For instance, the ambient lighting conditions may change if a new street light is installed or an older one goes out. In this regard, while the computing devices 110 are controlling the vehicle in the autonomous driving mode, these computing devices, by way of the aforementioned techniques, may attempt to observe a stopping location. This stopping location may be one selected by the passenger, for instance when setting up a trip as discussed above, and received by the computing devices 110 from the server computing devices 410 when the vehicle is dispatched. Alternatively, this stopping location may simply be a closest stopping location to the destination for the vehicle, where the destination is received from the server computing devices 410 when the vehicle is dispatched. For instance, given the destination represented by marker 710 of FIG. 7, the stopping location may be parking spot 682 corresponding to stopping location 282.

This observing may include observing whether the stopping location is available (i.e. unoccupied by another vehicle or object) or unavailable (occupied or otherwise not available). In addition or alternatively, this observing may include observing ambient lighting conditions for the stopping area. For instance, as discussed above, this may include using an image captured by a camera of the vehicle, using an exposure value for a camera of the vehicle, using light sensors of the vehicle, using a current state of the headlights of the vehicle, using a current state of an internal electronic display of the vehicle, etc. to determine ambient lighting conditions at the stopping location 282.

When the observed or "original" stopping location is occupied and/or the ambient lighting conditions are low, for instance below a threshold of 0.3 on the aforementioned scale of 0 to 1, the computing devices 110 may identify a new stopping location of the predetermined stopping locations based on ambient lighting conditions of the new stopping location. As such, ambient lighting conditions for the new stopping location some distance from the vehicle may be determined from camera images captured by a camera of the vehicle 100, ambient lighting conditions at the vehicle may be determined from camera images and/or light sensors as discussed above and/or ambient light conditions for the new stopping location may also be determined from the map information. For instance, the computing devices 110 may use this information to determine the ambient lighting conditions of all stopping locations within some predetermined distance of the original stopping location or the destination and/or a next closest available stopping location with the greatest relative ambient lighting conditions. As one example, this predetermined distance may be a reasonable walking distance, such as 5 minutes or more or less, between the original stopping location and the new stopping location. The search may also have other limitations, such as the new stopping location being along the same lane as the original stopping location. Returning to the example of FIG. 6, the computing devices may determine the ambient lighting conditions of stopping locations 280 and 284. In this example, stopping locations 286 and 288 may be considered "too far" from the destination represented by marker 710.

The computing devices 110 may perform a cost analysis to determine whether it is "worth" having a passenger walk a longer distance to stop the vehicle in a more well-lit stopping location. For instance, the increase in the ambient lighting conditions between the original stopping location and each of the stopping locations within the predetermined distance of the stopping location and/or the next closest available stopping location with the greatest relative ambient lighting conditions may be compared with the additional distance that a passenger may have to walk between the original stopping location or the destination and the new stopping location. For instance, the distance between stopping location 280 and stopping location 282 (the additional distance that a passenger would have to walk) may be compared with the increase in the ambient lighting conditions of stopping location 280 and stopping location 282. Similarly, the distance between stopping location 284 and stopping location 282 (the additional distance that a passenger would have to walk) may be compared with the increase in the ambient lighting conditions of stopping location 284 and stopping location 282.

This analysis may be slightly different in cases where the original stopping location is actually occupied or in cases where the ambient lighting conditions for the original stopping conditions are so low, for instance very close to 0 on the aforementioned scale of 0 to 1, that the vehicle could not stop at the original stopping location. In such cases, the cost analysis may compare the ambient lighting location of and distances to different stopping locations to one another. For instance, the computing devices 110 may compare the distances to and ambient lighting conditions of stopping locations 284 and 280. Alternatively, the cost analysis may be disregarded altogether if there is only one other of the predetermined stopping locations, for instance only one of 284 and 280, available (i.e. not occupied).

In addition or alternatively, the passenger or user (in the case of a pick up or delivery of goods) may be provided with one or more choices to allow a passenger to accept or decline the new stopping location via a notification on the passenger's mobile device or on some display or other UI within the vehicle (in the case of a drop off). In any event, when the new stopping location is identified and the cost analysis indicates that it is worthwhile and/or the passenger has confirmed the new stopping locations, the computing devices 110 may control the vehicle in the autonomous driving mode to stop at the new stopping location.

In addition, the aforementioned map information and real time determinations of map information may also be used for other purposes. For instance, when a vehicle is not in use, it may be parked in a parking location. When parking for long or short periods of time, even when not servicing passengers, it may be useful to park the vehicle in a well-lit location in order to reduce the likelihood of the vehicle being tampered with or broken into. In this regard, ambient lighting conditions may be used to select a preferred place to park the vehicle in such situations.

Figure 9:
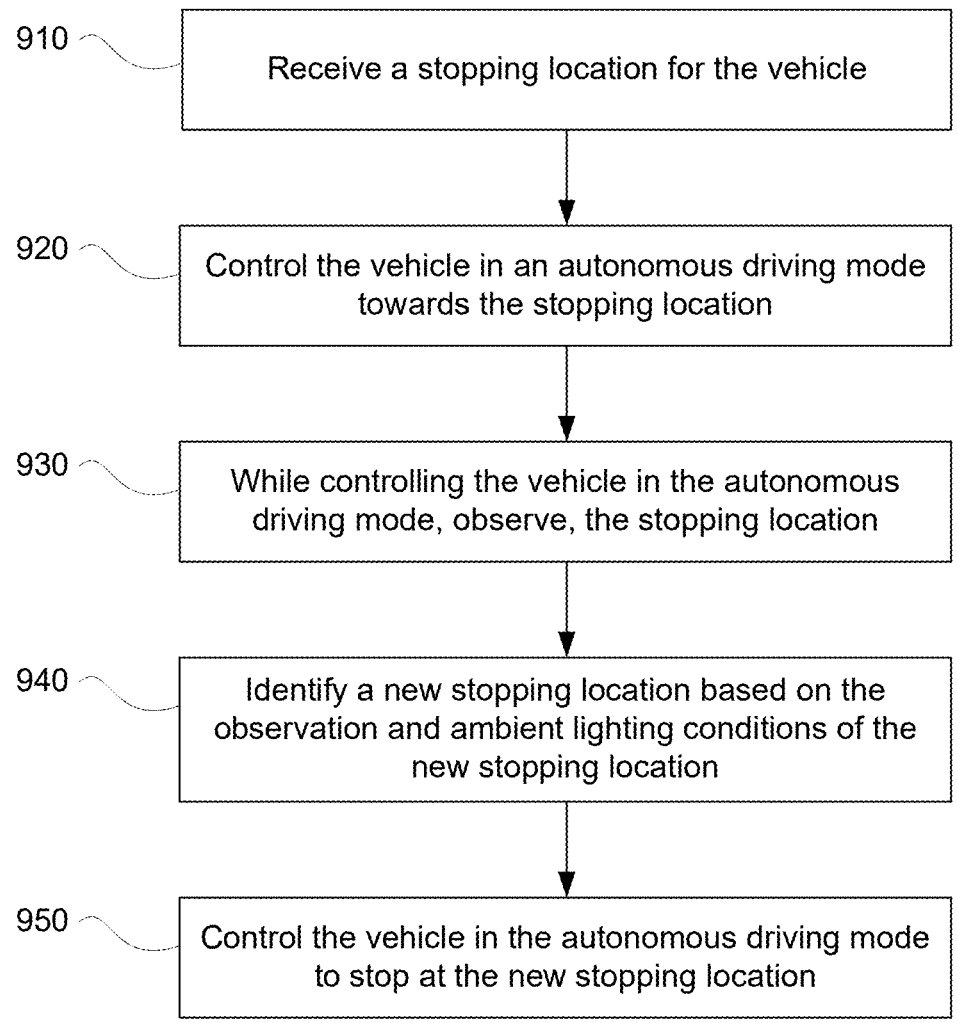
FIG. 9 is an example flow diagram in accordance with aspects of the disclosure.

FIG. 9 includes an example flow diagram 900 of some of the examples for controlling a vehicle in order to stop to pickup or drop off one or more passengers or goods, which may be performed by one or more processors such as processors of computing devices 110. In this example, at block 910 a stopping location for the vehicle is received. At block 920, the vehicle is controlled in an autonomous driving mode towards the stopping location. At block 930, while controlling the vehicle in the autonomous driving mode, the stopping location is observed. At block 940, a new stopping location is identified based on the observation and ambient lighting conditions of the new stopping location. At block 950, the vehicle is controlled in the autonomous driving mode to stop at the new stopping location.

The features described herein may allow for better passenger experience in terms of comfort and safety by stopping an autonomous vehicle for pickups and drop offs in well-lit areas. By using historical data, passengers are able to arrange pickups and drop offs (of passengers or goods) in advance in well-lit areas. In addition, by using real time information collected at an autonomous vehicle, the vehicle is able to react to changing circumstances. Finally, the ambient lighting conditions may also be used to identify parking locations for a vehicle when not service passengers in order to increase safety and security for the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in order to stop the vehicle, the method comprising:
  receiving, by one or more processors, a stopping location for the vehicle;
  controlling, by the one or more processors, the vehicle in an autonomous driving mode towards the stopping location;
  while controlling the vehicle towards the stopping location, determining, by the one or more processors, whether an ambient lighting condition of the stopping location is below a threshold;
  in response to determining that the ambient lighting condition of the stopping location is below the threshold, identifying, by the one or more processors, a new stopping location; and
  controlling, by the one or more processors, the vehicle in the autonomous driving mode to stop at the new stopping location.

2. The method of claim 1, wherein determining the ambient lighting condition of the stopping location is based on an image captured by a camera of the vehicle.

3. The method of claim 1, wherein determining the ambient lighting condition for of the stopping location is based on an exposure value for a camera of the vehicle.

4. The method of claim 1, wherein determining the ambient lighting condition for of the stopping location is based on light sensors of the vehicle.

5. The method of claim 1, wherein determining the ambient lighting condition of the stopping location is based on a current state of an internal display of the vehicle.

6. The method of claim 1, further comprising identifying the new stopping location based on an ambient lighting condition of the new stopping location from an image captured by a camera of the vehicle.

7. The method of claim 1, further comprising identifying the new stopping location based on an ambient lighting condition of the new stopping location from map information identifying historical ambient lighting condition of the new stopping location.

8. The method of claim 1, wherein the new stopping location is identified in a same lane as the stopping location.

9. The method of claim 1, wherein the new stopping location is identified within a predetermined distance of the stopping location.

10. A system for controlling a vehicle in order to stop the vehicle, the system comprising one or more processors configured to:
  receive a stopping location for the vehicle;
  control the vehicle in an autonomous driving mode towards the stopping location;
  determine whether an ambient lighting condition of the stopping location is below a threshold;
  in response to determining that the ambient lighting condition of the stopping location is below the threshold, identify a new stopping location; and
  control the vehicle in the autonomous driving mode to stop at the new stopping location.

11. The system of claim 10, wherein the one or more processors are further configured to determine the ambient lighting condition of the stopping location based on an image captured by a camera of the vehicle.

12. The system of claim 10, wherein the one or more processors are further configured to determine the ambient lighting condition of the stopping location is-based on an exposure value for a camera of the vehicle.

13. The system of claim 10, wherein the one or more processors are further configured to determine the ambient lighting condition of the stopping location based on light sensors of the vehicle.

14. The system of claim 10, wherein the one or more processors are further configured to determine the ambient lighting condition of the stopping location based on a current state of an internal display of the vehicle.

15. The system of claim 10, wherein the one or more processors are further configured to identify the new stopping location based on an ambient lighting condition of the new stopping location from on an image captured by a camera of the vehicle.

16. The system of claim 10, wherein the one or more processors are further configured to identify the new stopping location based on an ambient lighting condition of the new stopping location from map information identifying historical ambient lighting condition of the new stopping location.

17. The system of claim 10, wherein the new stopping location is identified in a same lane as the stopping location.

18. The system of claim 10, wherein the new stopping location is identified within a predetermined distance of the stopping location.

19. The method of claim 1, wherein identifying the new stopping location involves identifying a next closest available stopping location to the stopping location with a greatest relative ambient lighting condition.

20. The system of claim 10, wherein identifying the new stopping location involves identifying a next closest available stopping location to the stopping location with a greatest relative ambient lighting condition.

* * * * *